(12) United States Patent
Schmidt

(10) Patent No.: US 7,434,842 B2
(45) Date of Patent: Oct. 14, 2008

(54) COUPLING WITH LATCH MECHANISM

(75) Inventor: Mark F. Schmidt, Forest Lake, MN (US)

(73) Assignee: Colder Products Company, St. Paul, MN (US)

( * ) Notice: Subject to any disclaimer, the term of this patent is extended or adjusted under 35 U.S.C. 154(b) by 0 days.

(21) Appl. No.: 10/892,914

(22) Filed: Jul. 15, 2004

(65) Prior Publication Data
US 2005/0012330 A1  Jan. 20, 2005

Related U.S. Application Data

(60) Provisional application No. 60/488,461, filed on Jul. 17, 2003.

(51) Int. Cl.
*F16L 55/00* (2006.01)
*F16L 35/00* (2006.01)

(52) U.S. Cl. .................. 285/91; 285/81; 285/308; 285/317; 285/318

(58) Field of Classification Search .................. 285/81, 285/91, 308, 317, 318
See application file for complete search history.

(56) References Cited

U.S. PATENT DOCUMENTS

| | | | |
|---|---|---|---|
| D42,368 S * | 3/1912 | Mossberg | D8/18 |
| 4,116,476 A * | 9/1978 | Porter et al. | 285/124.4 |
| 4,863,201 A * | 9/1989 | Carstens | 285/317 |
| 5,033,777 A | 7/1991 | Blenkush | |
| 5,052,725 A | 10/1991 | Meyer et al. | |
| 5,316,041 A * | 5/1994 | Ramacier et al. | 137/614.04 |
| 5,494,074 A | 2/1996 | Ramacier, Jr. et al. | |
| 5,845,943 A * | 12/1998 | Ramacier et al. | 285/12 |
| 5,975,489 A * | 11/1999 | deCler et al. | 251/149.1 |
| 6,112,855 A | 9/2000 | Camacho et al. | |
| 7,040,670 B2 * | 5/2006 | Madden | 285/376 |

FOREIGN PATENT DOCUMENTS

BE  479 098  1/1948
BE  479 098 A  1/1948

* cited by examiner

*Primary Examiner*—James M Hewitt
*Assistant Examiner*—Jay R Ripley
(74) *Attorney, Agent, or Firm*—Merchant & Gould P.C.

(57) ABSTRACT

A coupling apparatus having coupling body with a mechanical latch assembly. The mechanical latch assembly includes a modified latch plate. The latch plate defines a main portion having a top end and a bottom end and includes an annular aperture disposed between the top and bottom ends. A lever portion is disposed proximate the top end. The lever portion enables the latch plate to move within a coupling body, so as to operate the mechanical latch assembly in a released position and a latched position. A raised edge is disposed about a portion of the annular aperture. The raised edge is disposed proximate the bottom end and extends radially inward of the inner edge defined by the annular aperture. A pin opening is disposed proximate the bottom end opposite of the lever portion. The pin opening is positioned radially outward from the annular aperture, and defines a separate enclosed edge.

10 Claims, 6 Drawing Sheets

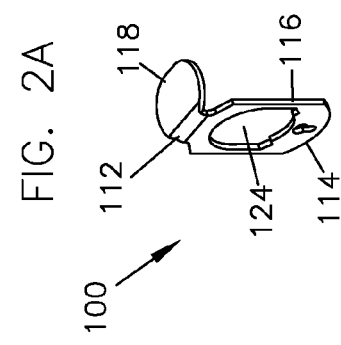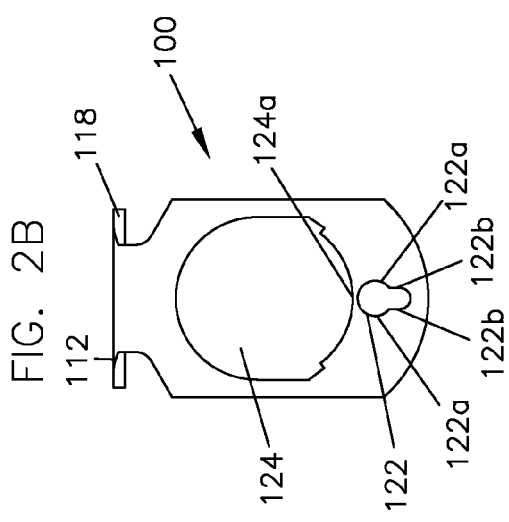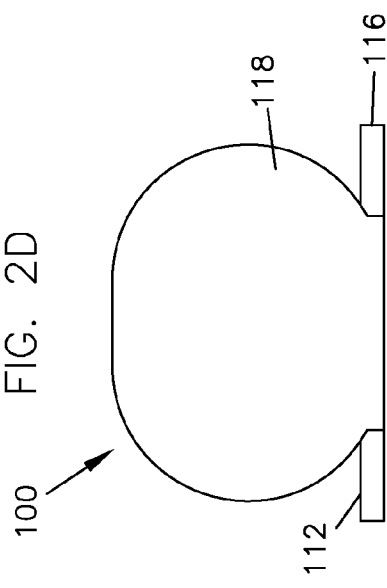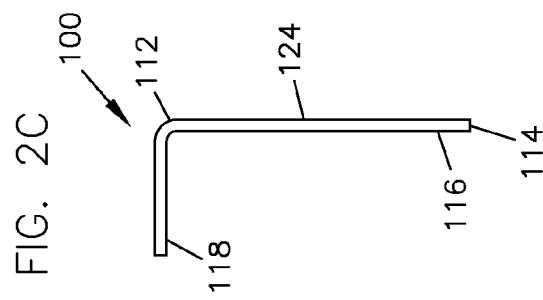

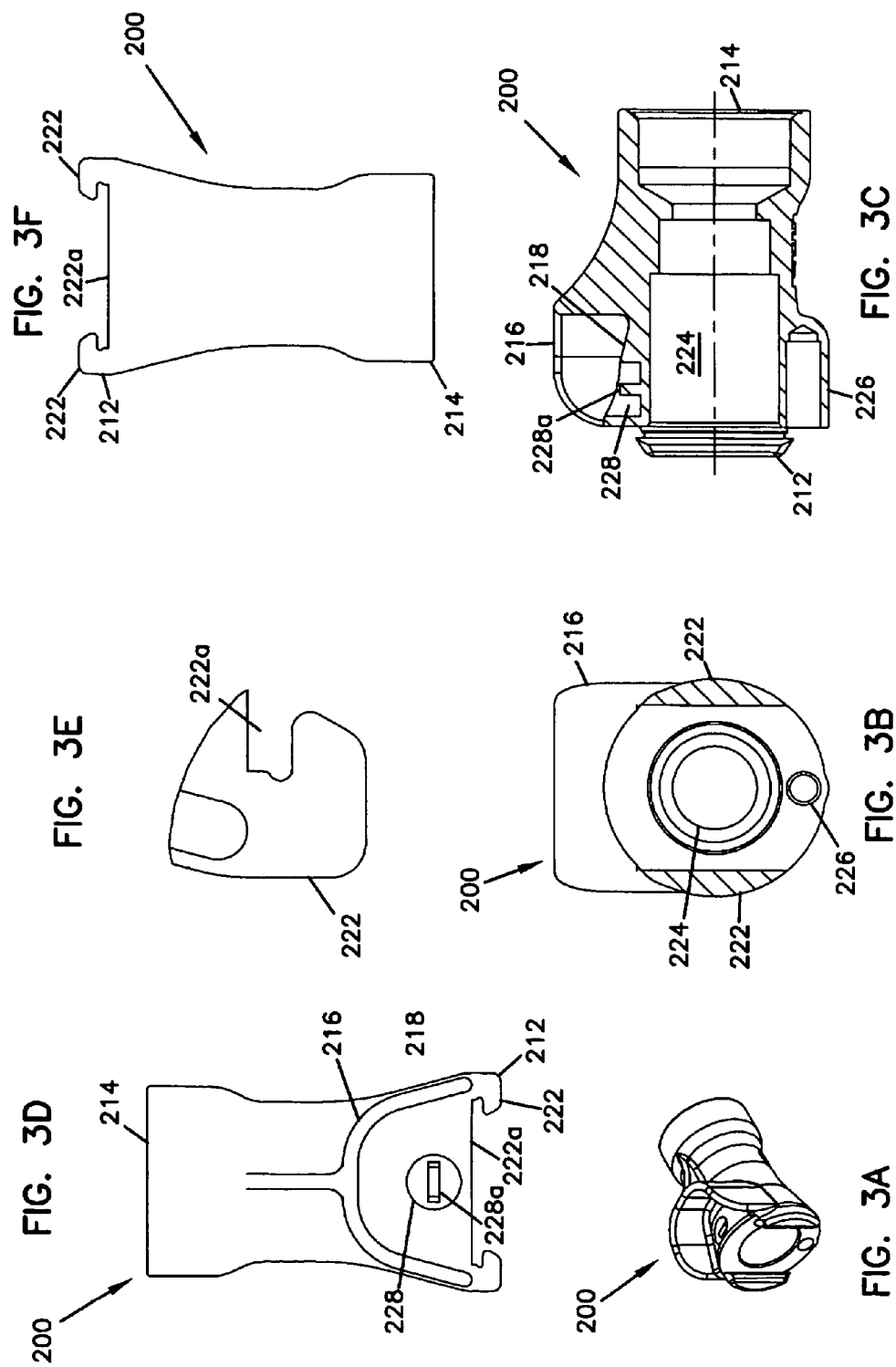

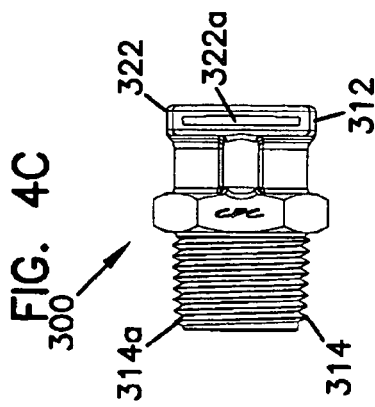
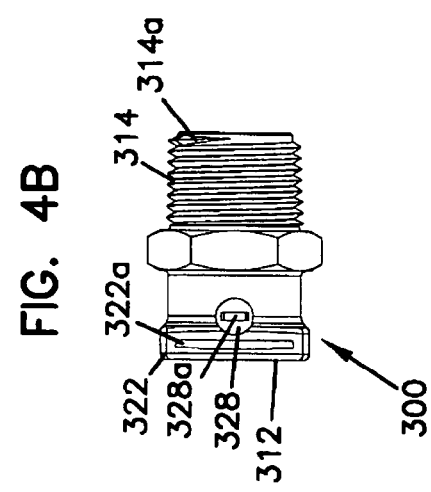
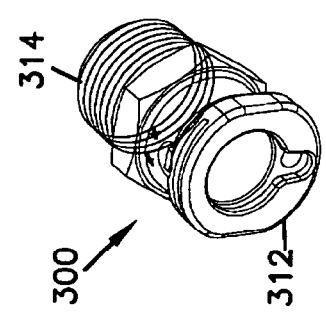
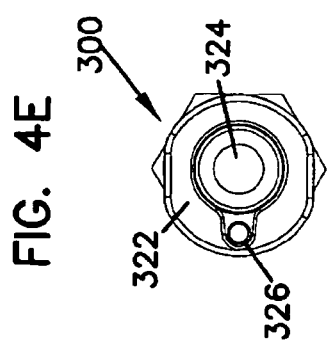
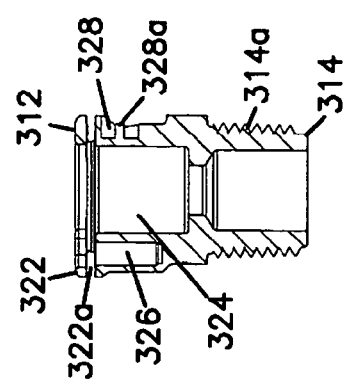

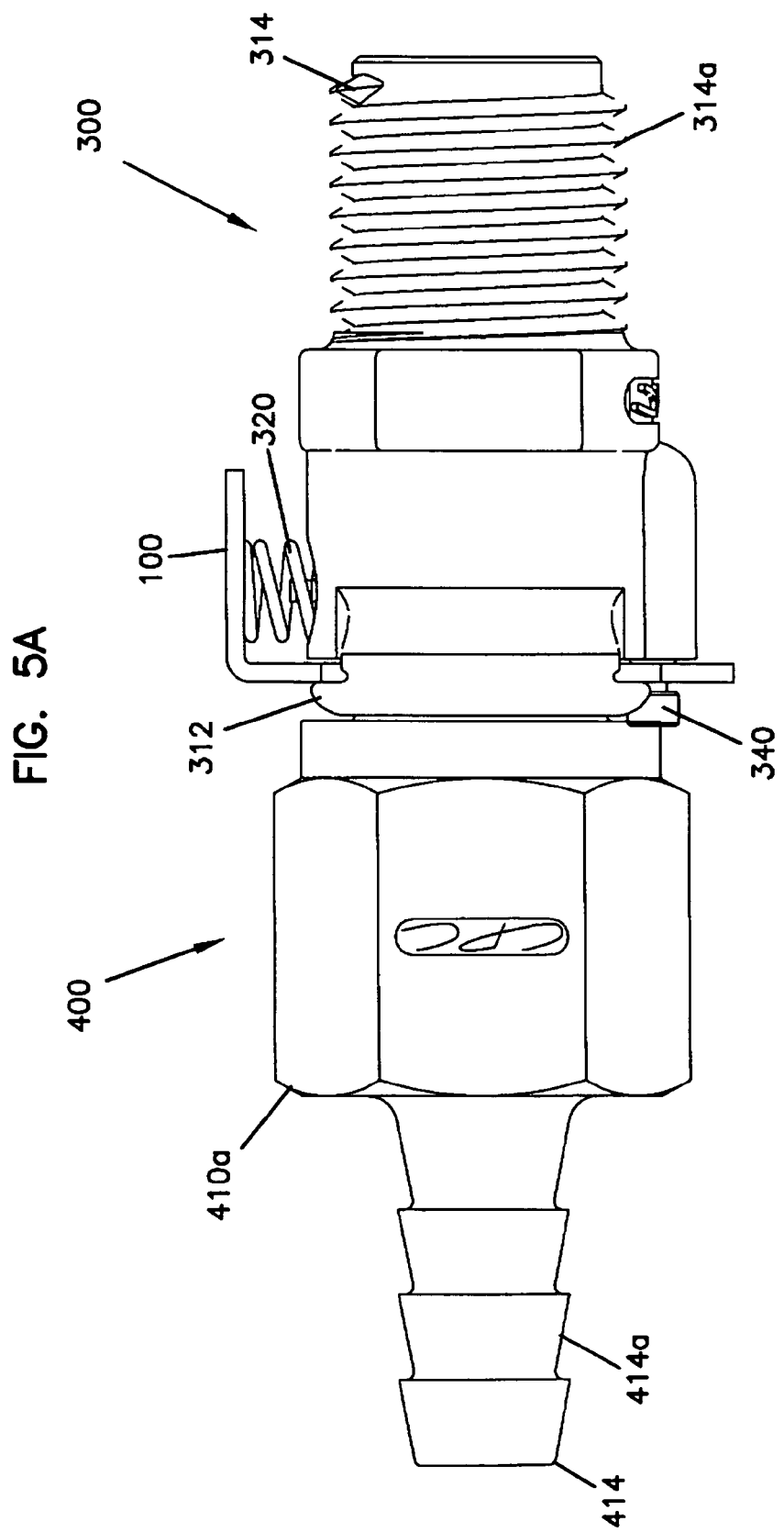

200
COUPLING WITH LATCH MECHANISM

This application claims the benefit of Provisional Application No. 60/488,461, filed Jul. 17, 2003, which is incorporated by reference herein in its entirety.

FIELD OF INVENTION

The invention is related to a fluid connector with a latch mechanism. More particularly, the present invention is related to a fluid coupling having a latch mechanism with an improved latch plate structure. The latch mechanism is used in fluid couplings for quick connection/disconnection of tubings in pressured fluid conveyance conditions.

BACKGROUND OF THE INVENTION

Connectors for fluid transport are common and widely used. Typically, such connectors often employ a female coupling that connects with a male insert member. These couplings provide a structure that can be readily coupled and uncoupled from a male insert member using a quick connect/disconnect configuration. To achieve this quick connect/disconnect configuration, a latch mechanism usually is incorporated with the coupling. Such mechanical latches provide a releasable lock mechanism for connecting and retaining a male insert member to the coupling, so that sealing surfaces of a coupling and male insert member remain in contact for a fluid tight seal.

Incorporated herewith by reference, U.S. Pat. No. 5,033,777 to Blenkush discloses one example of a latch mechanism 40. The latch mechanism 40 includes a latch plate 80 that is slideably mounted in grooves formed by two projections 82 extending from the front of a female coupling assembly 14. The latch plate 80 is slideably mounted for transverse movement with respect to a bore 30 of the female coupling assembly 14 between a first released position (FIG. 4) and a second latched position (FIG. 5). The latch plate 80 defines an annular aperture 84 therein. In the released position, the tubular portion 18 of a male insert 12 can be inserted through the aperture 84 and into the bore 30. In the latched position, an inner edge of the latch plate 80 moves into a groove 24 of the male insert 12, thereby positively latching the male insert 12 with the female coupling assembly 14 in a coupled state.

A housing of the female coupling assembly 14 defines a recess of indentation 90 proximate its top portion and between the projections 82. The latch plate 80 includes a lever portion 80a that is folded over so as to provide a relatively flat lever. The lever portion 80a fits in the recess provided by the indentation 90. A coiled spring 92 is positioned between the lever portion 80a and a bottom surface of the indentation 90. The coiled spring 92 biases the latch plate 80 transversely of the bore 30 and toward the latched position.

A locking pin 94 having a varying diameter axially extends from a bore 96. The locking pin retains the latch plate 80 in its released position when the male insert 12 and the female coupling assembly 14 are in an uncoupled state. The bore 96 is positioned radially outward from the bore 30 and on an opposite side from the lever 80a, so as to be diametrically opposed to the lever 80a. The locking pin 94 extends through a slot of the latch plate 80 having a variable width defined by edges 98a and 98b. The edges 98a, 98b extend radially outward from the inner edge of the aperture 84. The locking pin 94 is longitudinally moveable through the slot between a first position wherein the locking pin 94 allows the spring 92 to move the latch plate 80 into its latched position. The locking pin 94 in its second position also serves to limit the distance, which the latch plate 80 moves from its released position to its latched position. A coiled spring 100 is positioned between a collar portion 94a of the locking pin 94 and an end of the bore 96, so as to longitudinally bias the locking pin 94 toward the first released position.

The male insert 12 includes a collar 102 about the circumference thereof which is spaced a predetermined axial distance from the groove 24 toward the second end 28 of the male insert 12. The collar 102 is constructed and arranged to engage the locking pin 94, as the tubular portion 18 is inserted into the bore 30 of the female coupling assembly 14 a predetermined distance, such that the locking pin 94 is pushed back from its first position into its second position.

The radially extending edges 98a are spaced farther apart than edges 98b. In this configuration, the slot has a portion defined by edges 98a near the inner edge of the aperture 84 having a greater width than the portion defined by edges 98b near the end of the slot and farthest removed from the inner edge. When the locking pin 94 is in the first released position, a portion 94b of the locking pin 94 having a greater diameter than the width of the slot defined by the edges 98b, extends through the slot defined by edges 98a. The locking pin portion 94b makes contact with edges 98b, and prevents the latch plate 80 from being moved into the latched position by the coil spring 92. As the male insert 12 is inserted into the female coupling assembly 14, the collar 102 engages the end of the locking pin 94 and moves it longitudinally relative to the female coupling assembly. The locking pin moves into the bore 96 until a portion 94c of the locking pin 94 having a diameter less than the width of the slot defined by the edges 98b aligns therewith, such that the locking pin 94 no longer engages the edges 98b. The latch plate 80 then moves into the latched position by the coil spring 92 and engages the groove 24.

By pressing radially inward on the lever 80a, the latch plate 80 is caused to move radially such that the locking pin 94 extends through the enlarged slot edges 98a near the inner edge. The latch plate 80 can then be disengaged from the groove 24, whereby the male insert 12 can be removed from the female coupling assembly 14. When the male insert 12 is removed, the collar 102 and the locking pin 94 are disengaged whereby the spring 100 biases the locking pin toward its first position, so that the pin portion 94b engages the edges 98b of the slot and retains the latch plate 80 in its released position.

The latch plate of the latch mechanism above, however, may still experience problems in reliability and performance. As the latch plate provides its slot continuously extending from the annular aperture where the inner edge is directly adjacent the slot, sharp burrs and corners exist that can comprise sealing surfaces of a connecting male insert. Such surfaces can include resilient o-rings or part line free sealing surfaces disposed about the collar of the male insert, and that sealingly engage with the inner surface defined by the bore of the female coupling assembly. Further, the latch plate above includes an inner edge that corresponds to the radial perimeter defined by the annular aperture. Where increased pressures are used, such as up to 100 psi, a connecting male insert may rotate and/or twist relative to the female coupling. In this configuration of an inner edge, the male insert may unfavorably cam out and become separated from the female coupling assembly during use.

While the above design may be suitable for its intended purposes, improvements may still be made upon the latch mechanism structure of such couplings. Therefore, there is a need for a latch mechanism with a latch plate having improved reliability and performance. A coupling is desired that provides a latch plate that prevents separation when connected with a piece of fluid transport equipment, such as a connecting insert, and that protects sealing surfaces of a connecting insert from being damaged.

SUMMARY OF THE INVENTION

In accordance with the present invention, the above and other problems were solved by providing a coupling apparatus and assembly that includes a latch mechanism having a modified latch plate with a raised edge for engaging a connecting insert and a pin opening having an enclosed edge.

In one embodiment, a coupling apparatus for fluid dispensing includes a body with a first end and a second end. The first and second ends define a first bore for enabling fluid passage longitudinally therethrough. A mechanical latch assembly is disposed proximate one of the first or second ends. The mechanical latch assembly includes a latch plate, a first biasing member, a locking pin and a second biasing member.

In one preferred embodiment, the latch plate is slidably mounted within a groove formed through the body, where the groove extends transversely of the first bore. The latch plate defines a main portion having a top end and a bottom end. The latch plate includes an annular aperture disposed between the top and bottom ends and being in fluid communication with the first bore. A lever portion is disposed proximate the top end of the main portion. The lever portion enables the latch plate to reciprocate within the groove in a released position and a latched position. A raised edge is circumferentially disposed about a portion of the annular aperture. The raised edge is disposed proximate the bottom end and extending radially inward of the annular aperture.

A pin opening is disposed proximate the bottom end opposite of the lever portion. The pin opening is positioned radially outward from the annular aperture, and defines an enclosed edge.

Preferably, the first biasing member is positioned between a bottom surface of the lever portion and an outer surface of the body. The biasing member biases the latch plate in the latched position.

Preferably, the locking pin is positioned in a second bore being disposed radially outward from the first bore and extending in a longitudinal direction. The locking pin extends through the pin opening and is longitudinally moveable within the second bore. The locking pin is movable through the pin opening between a first position to retain the latch plate in the released position and a second position to allow the biasing member to move the latch plate in the latched position.

Preferably, the second biasing member is positioned between an end of the locking pin and an end of the second bore. The second biasing member biases the locking pin in the first position.

In another embodiment, the coupling apparatus above may be incorporated in a coupling assembly further including a mating male insert member. In one preferred embodiment, the male insert member defines a first end and a second end with an opening for enabling fluid passage longitudinally through the first and second ends. The male insert member includes a tubular portion extending toward the first end and being insertable in the coupling apparatus. The tubular portion includes an outer surface having a circumferentially disposed groove. The groove is engageable with the raised edge of the latch plate to connect and disconnect the male insert with the coupling apparatus. The tubular portion includes a sealing member disposed proximate the first end. The sealing member sealingly engages an inner surface of the first bore when the male insert is inserted in the coupling apparatus.

Preferably, the coupling apparatus and the male insert member each may be connected with a fluid line or another piece of fluid transport equipment at ends opposites of the ends connecting the coupling apparatus and male insert member.

These and other various advantages and features of novelty, which characterize the invention, are pointed out in the following detailed description. For better understanding of the invention, its advantages, and the objects obtained by its use, reference should also be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2A represents an elevated perspective view of one embodiment of a latch plate in accordance with the principles of the present invention.

FIG. 2B represents an elevated end view of the latch plate of FIG. 2A.

FIG. 2C represents an elevated side view of the latch plate of FIG. 2A.

FIG. 2D represents an elevated top view of the latch plate of FIG. 2A.

FIG. 3A represents an elevated perspective view of one embodiment of a coupling body capable of mounting the latch plate of FIG. 2A.

FIG. 3B represents an end sectional view of the coupling body of FIG. 3A.

FIG. 3C represents a side sectional view of the coupling body taken from FIG. 3B.

FIG. 3D represents an elevated top view of the coupling body of FIG. 3A.

FIG. 3E represents a partial top view of the coupling body taken from Detail A in FIG. 3D.

FIG. 3F represents a bottom view of the coupling body of FIG. 3A.

FIG. 4A represents an elevated perspective view of another embodiment of a coupling body capable of mounting the latch plate of FIG. 2A in accordance with the principles of the present invention.

FIG. 4B represents an elevated top view of the coupling body of FIG. 4A.

FIG. 4C represents an elevated bottom view of the coupling body of FIG. 4A.

FIG. 4D represents a side sectional view of the coupling body of FIG. 4A.

FIG. 4E represents an end view of the coupling body of FIG. 4A.

FIG. 4F represents a partial elevated top view of the coupling body taken from FIG. 4B.

FIG. 5A represents an elevated side view of the coupling body of FIG. 4A and the latch plate of FIG. 2A connected with one embodiment of a male insert in accordance with the principles of the present invention.

DETAILED DESCRIPTION OF THE PREFERRED EMBODIMENT

Figure 1A:
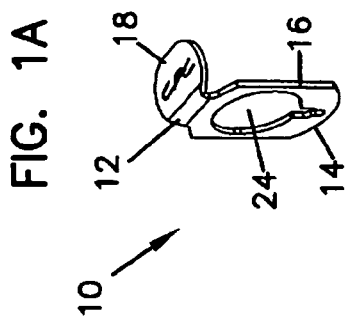
FIG. 1A represents an elevated perspective view of a latch plate of prior art.
Figure 1B:
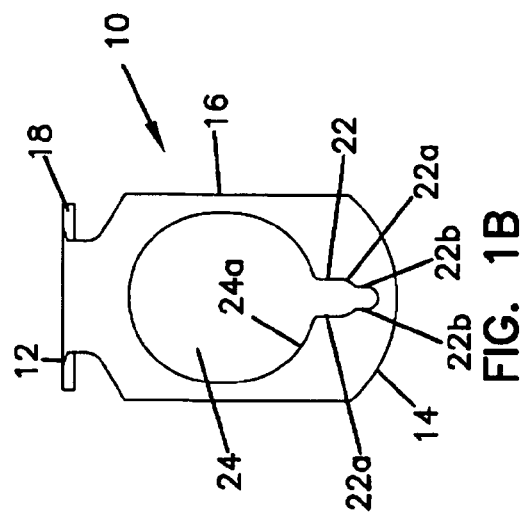
FIG. 1B represents an elevated end view of the latch plate of FIG. 1A.
Figure 1C:
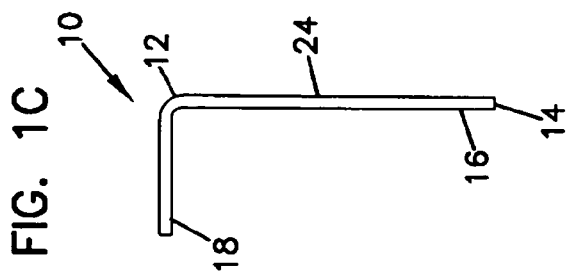
FIG. 1C represents an elevated side view of the latch plate of FIG. 1A.
Figure 1D:
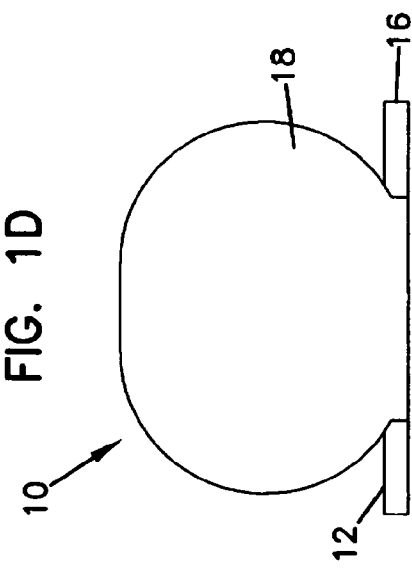
FIG. 1D represents an elevated top view of the latch plate of FIG. 1A.

In the following description of the illustrated embodiments, reference is made to the accompanying drawings that form a part hereof, and in which is shown by way of illustration of the embodiments in which the invention may be practiced. It is to be understood that other embodiments may be utilized as structural changes may be made without departing from the spirit and scope of the present invention.

FIGS. 1A through 1D illustrate a known latch plate 10 for a latch mechanism typically used in quick connect/disconnect couplings. The latch plate 10 is structured and configured similarly as the latch plate 80 of U.S. Pat. No. 5,033,777 (hereinafter Patent '777). The latch plate 10 can be mounted on the female coupling assembly 14 of Patent '777 in the same manner. The latch plate 10 is used to latch and release a mating insert, such as the male insert 12 of Patent '777. The latch plate 10 includes a top end 12 and a bottom end 14, and defines a main portion 16 and a lever portion 18 that extends transversely of the main portion 16. The lever portion 18 is disposed proximate the top end 12, and preferably is disposed at the top end 12. An annular aperture 24 is formed through the main portion 16 between the top end 12 and the bottom end 14. The annular aperture 24 provides an inner edge 24a that is engageable with a groove on a mating insert, such as the groove 24 of the male insert 12 in Patent '777. The inner edge 24a is defined as the outer circumferential edge of the annular aperture 24.

A slot 22 of varying width is positioned proximate the bottom end 14. The slot 22 is continuously adjacent with the opening defined by the annular aperture 24, such that there is no obstruction or break therebetween. The slot 22 resembles a continuous opening. The slot 22 is structured similarly as in Patent '777, and defines the varying width having first and second edge portions 22a, 22b. Preferably, the slot 22 is positioned radially outward from the annular aperture 24 and opposite of the lever portion 18. The first edge portion 22a has a width that is greater than a width of the second edge portion 22b. The edge portions 22a, 22b are structured similarly as in Patent '777, so as to communicate with a locking pin so as to impart movement of the latch plate 10 in operating a latch mechanism in the released and latched positions.

FIGS. 2A through 2D illustrate a preferred embodiment of a latch plate 100. The latch plate 100 may similarly be mounted within a coupling assembly as latch plate 10 in the female coupling assembly 14 of Patent '777. The latch plate 100 also is connectable with a mating insert, such as the male insert 12 in Patent '777. The differences in latch plate 100 from latch plate 10 and Patent '777 are further described hereafter.

The latch plate 100 defines a top end 112 and a bottom end 114, with a main portion 116 therebetween. A lever portion 118 is disposed proximate the top end 112. Preferably the lever portion 118 is disposed at the top end 112, and extends transversely and perpendicularly of the main portion 116. An annular aperture 124 is formed through the main portion 116 between the top end 112 and the bottom end 114. The annular aperture is defined by a perimeter edge and may be a circumferential edge through the latch plate 100. The annular aperture 124 provides an inner edge 124a that is engageable with a groove on a mating insert, such as the groove 24 of the male insert 12 in Patent '777. In contrast to Patent '777, the annular aperture 124 defines the inner edge 124a as a raised radial edge extending radially inward of a circumferential edge defined by the annular aperture 124. Preferably, the raised radial edge 124a is disposed on a perimeter edge or circumferential edge defined by the annular aperture 124. More preferably, the raised radial edge is disposed proximate the bottom end 114 along the perimeter edge and opposite the lever portion 118. The raised radial edge 124a can provide a smooth circumferential contour of an outer surface of a mating insert with no sharp edges or burrs.

A pin opening 122 of varying width is positioned proximate the bottom end 114. The pin opening 122 includes a varying width having first and second edge portions 122a, 122b. Preferably, the pin opening 122 is positioned radially outward from the annular aperture 124 and opposite of the lever portion 118. The first edge portion 122a has a width greater than a width of the second edge portion 122b. The first edge portion 122a is disposed proximate the annular aperture 124 relative to the second edge portion 122b. The edge portions 122a, 122b are structured so as to communicate with a locking pin to impart movement of the latch plate 100 in operating a latch mechanism in the released and latched positions, such as described above in Patent '777. In contrast to Patent '777, the pin opening 122 is defined as an enclosed edge. Preferably, the pin opening 122 is its own separate opening from the aperture 124.

The latch plate 100 provides improved structural features and performance when used in a latch mechanism for quick connect/disconnect couplings. The raised radial edge 124a provides improved support and engagement performance with a mating insert, as in the groove 24 on the male insert of Patent '777. When a coupling is used under increased pressures, for instance at about 100 psi, the raised radial edge 124a prevents a coupling from camming out and otherwise separating from an insert when the connector assembly experiences relative rotation and twisting. Further, the smooth circumferential contour provided by the raised radial edge 124a helps maintain seal surfaces on a mating insert by preventing the presence of a sharp burrs and edges. Such sharp burrs can damage seal members or surfaces on a mating insert, such as resilient o-rings and part line free sealing surfaces. The enclosed edge of the pin opening 122 provides added strength to the connection with a mating insert. By enclosing the pin opening 122 and making it an opening separate from the annular aperture, sharp edges and burrs can be further avoided. In this configuration, the latch plate 110 provides advantages in maintaining seal surfaces on a mating insert.

FIGS. 3A through 3F illustrate one embodiment of a coupling body 200 for mounting the latch plate 100 and further latch mechanism structures. The coupling body 200 is structured and arranged similarly as the female coupling assembly 14 of Patent '777 with the following described features and differences. The coupling body 200 includes a first end 212 and a second end 214, and defines an opening or first bore 224 extending longitudinally through the first and second ends 212, 214. The first bore 224 enables fluid passage therethrough and is receivable for a mating insert. As in Patent '777, it will be appreciated that the first bore 224 may be provided with varying diameters therein for supporting valve structures, sealing structures, and other well known coupling structures used for adapting the coupling body 200 to other pieces of fluid transport equipment.

A groove 222a is formed from projections 222 at the first end 212, as best shown in FIGS. 3D through 3F and Detail A.

The groove 222a provides support for the latch plate 100 for slidably mounting the same therein. The latch plate 100 reciprocates within the groove 222a similarly as in Patent '777. It will be appreciated that the projections 222 may be formed as a single projection 322 from the first end 212. The single projection 322 forms a closed face coupling body at the first end 212, which is illustrated in detail in FIGS. 4A-4F. Such a configuration provides added support of a mating insert about an entire radius, and provides improvement in holding the coupling body and the mating insert in sealing engagement.

The coupling body 200 includes an indentation surface 218 surrounded by a partial shrouding or wall 216. The indentation surface 218 provides an area for the lever portion 118 to reside and be housed within the shrouding 216. Preferably, the indentation surface is substantially planar and flat relative to the circumferential contour of the outer surface of the coupling body 200. The indentation surface may include a recessed area 228 and stabilizing member 228a formed on the indentation surface 218. The recessed area 228 is supportable for a biasing member to be disposed therein, such as the coiled spring 92 of Patent '777. The stabilizing member 228a may provide further support and alignment for a biasing member, and preferably would engage a coiled spring through an opening thereof. Preferably, the stabilizing member 228a is formed as a substantially planar protrusion extending upward from the recessed area 228.

A second bore 226 is formed within the coupling body 200. Preferably, the second bore is disposed radially outward from the first bore 224 and substantially aligns with the pin opening 122. The second bore 226 is similarly constructed and arranged for housing a locking pin that is moveable therein, such as the locking pin 94 of Patent '777. The second bore 226 also may provide for a second biasing member, such as the coiled spring 100 of Patent '777, to bias the locking pin in a first and second positions.

Preferably, the coupling body 200 is constructed and arranged to allow mounting of a latch mechanism, as in the latch mechanism 40 in Patent '777, except for the incorporation of the latch plate 100 of the present invention. The coupling body 200 is connectable to a fluid line or other piece of transport equipment at the second end 214 for use in fluid delivery and transmission. It will be appreciated that any suitable structures mateable with the coupling body 200 may be incorporated so as to mount valve mechanisms and other adapting structures for connection to fluid line(s) and pieces of fluid transport equipment. It will be appreciated that the coupling body and incorporated latch mechanism may form a part of a fluid transport system connected with a mating coupler/insert and fluid source (not shown).

FIGS. 4A-4F illustrate another embodiment for a coupling body 300 for mounting the latch plate 100 and other latch mechanism structures. The coupling body 300 includes the following described features and differences from the coupling body 200 and the female coupling assembly of Patent '777. The coupling body 300 includes a first end 312 and a second end 314, and defines an opening or first bore 324 extending longitudinally through the first and second ends 312, 314. The second end 314 includes a connection means 314a, and may be configured as a threaded connection adaptable for connecting other pieces of fluid transport equipment, such as but not limited to a fluid line. It will be appreciated that other configurations and arrangements may be used at the second end 314 to accommodate a connection means. The first bore 324 enables fluid passage therethrough and is receivable for a mating insert. As in Patent '777 and coupling body 200, it will be appreciated that the first bore 324 may be provided with varying diameters therein for supporting valve structures, sealing structures, and other well known coupling structures used for adapting the coupling body 300 to other pieces of fluid transport equipment.

A groove 322a is formed from a single projection 322 at the first end 312, as best shown in FIGS. 4B-4C and Detail B from FIG. 4F. The groove 322a provides support for the latch plate 100 for slidably mounting the same therein. The latch plate 100 may reciprocate within the groove 322a. The projection 322 is formed as a single projection from the first end 312, preferably forming a closed face coupling body at the first end 312. The groove 322a defines a slot that can surround a latch plate 100 and improve support within the coupling assembly 300. In this configuration, the closed face first end formed by the single projection 322 provides added support of a mating insert about an entire radius. The closed face also provides improvement in holding the seal between the coupling body 300 and a mating insert.

The coupling body 300 includes a recess area 328, which provides a position for the lever portion 118 to be disposed on the body 300. Preferably, the recess area 328 is substantially planar and flat relative to the circumferential contour of the outer surface of the coupling body 300. The recess area 328 may further include a stabilizing member 328a formed within the recess area 328. The recessed area 328 is supportable for a biasing member to be disposed therein, such as the coiled spring 92 of Patent '777. The stabilizing member 328a may provide further support and alignment for a biasing member, and preferably would be insertable within an opening defined by a coiled spring. Preferably, the stabilizing member 328a is formed as a substantially planar protrusion extending upward from the recessed area 328.

A second bore 326 is formed within the coupling body 300. Preferably, the second bore 326 is disposed radially outward from the first bore 324 and is substantially aligned with the pin opening 122 of the latch plate 100. The second bore 326 is similarly constructed and arranged for housing a locking pin that is moveable therein, such as the locking pin 94 of Patent '777. The second bore 326 also may provide for a second biasing member to be housed therein, such as the coiled spring 100 of Patent '777. The second biasing member biases the locking pin in a first and second positions and imparts movement to the latch plate 100 between released and latch positions.

Figure 5B:
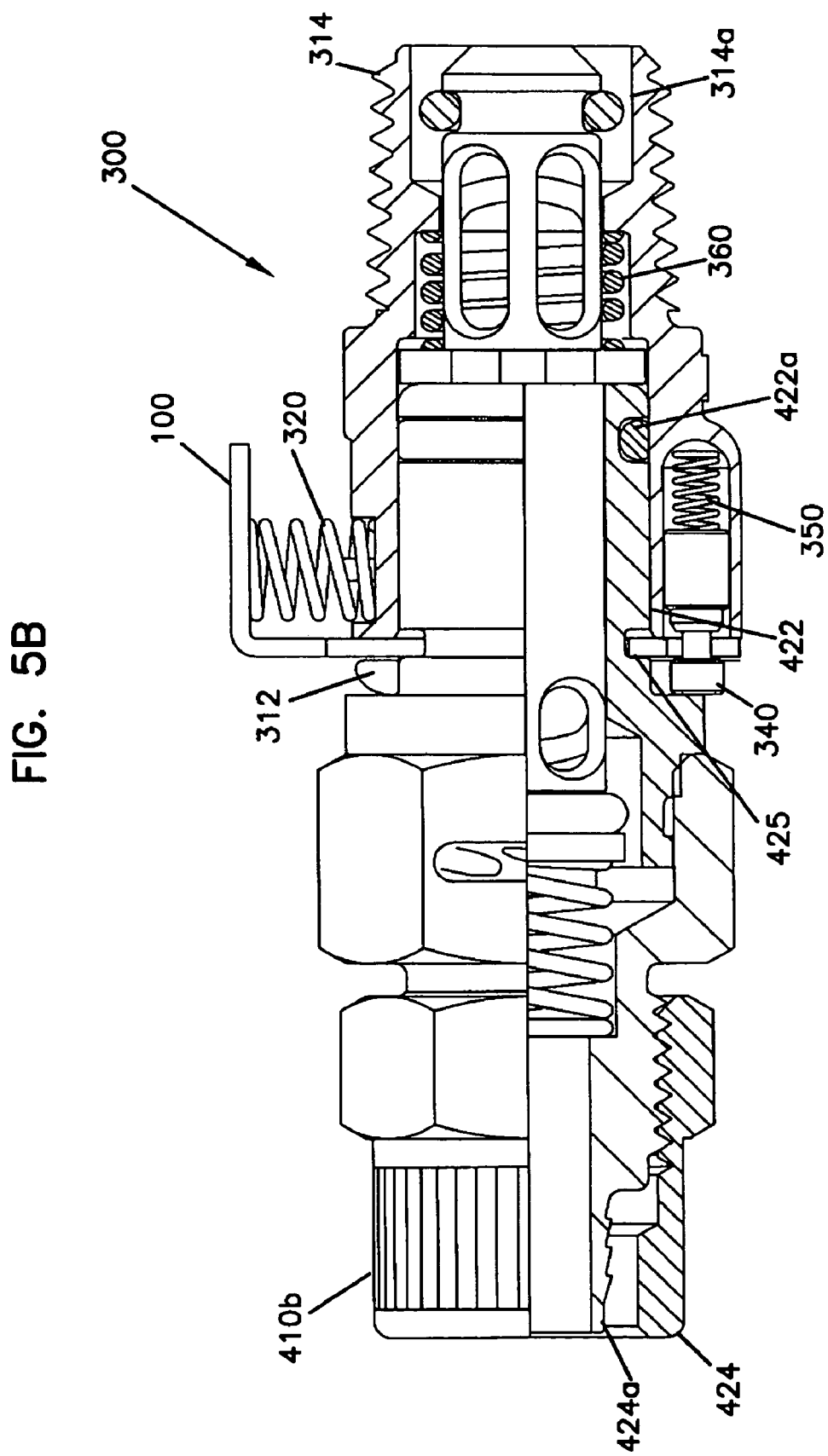
FIG. 5B represents a partial side sectional view of the coupling body of FIG. 4A and the latch plate of FIG. 2A connected with another embodiment of a male insert and further latch assembly and valve structures in accordance with the principles of the present invention.

FIGS. 5A and 5B illustrate the coupling body 300 and latch plate 100 assembled with a complete latch mechanism and connected with a mating insert 410a. FIG. 5A illustrates a side view of the coupling body 300 and latch plate 100 coupled with a mating male insert 410a. The mating male insert 410a includes an end 414 adaptable for connection with a piece of fluid transport equipment, and includes a connection means 414a. The connection means 414a may be arranged and configured with a barbed fitting suitable for connection with other pieces of fluid transport equipment, such as but not limited to a fluid line or source. It will be appreciated that other suitable structures may be employed at the end 414 for use as the connection means. The latch plate 100 is mounted within the groove 322a of the coupling body 300 as previously described. A biasing member 320 and locking pin 340 are generally illustrated. The biasing member 320 and locking pin are similarly arranged and configured as the biasing member 92 and locking pin 94 of Patent '777. Preferably, with the exception of the latch plate 100, similar latch mechanism structures, such as the latch mechanism 40 used in Patent '777 are employed within the coupling body 300.

FIG. 5B illustrates a partial side sectional view of the coupling body 300 and latch plate 100 of the present invention assembled with a complete latch mechanism and connected with a mating insert 410b. The mating male insert 410b includes an end 424 adaptable for connection with a piece of fluid transport equipment, and includes a connection means 424a. The connection means 424a may be arranged and configured with a barbed and threaded fitting suitable for connecting other pieces of fluid transport equipment, such as but not limited to a fluid line or source. It will be appreciated that other suitable structures may be employed at the end 424 for use as the connection means. An end 422 is insertable into the first bore 324. The end 422 includes an elongated collar portion with a sealing member 422a and a groove 425 disposed thereon. The elongated collar portion and groove 425 are constructed and arranged similarly as in Patent '777 for connecting and latching the male insert 410b with the coupling body 300. It will be appreciated that male insert 410a also may include similar collar portion and groove structures (not shown) as male insert 410b. The sealing member 422a is disposed distally on the end 422 and within a groove. Preferably, the sealing member 422a partially projects from a groove. The sealing member 422a sealingly engages an inner sidewall of the coupling body 300 when the male insert 410b is inserted and latched with the coupling body 300.

As shown, the latch plate 100 is mounted within the groove 322a of the coupling body 300 as previously described. A first biasing member 320, locking pin 340, second biasing member 350 are generally illustrated. The biasing members 320, 350 and locking pin 340 are similarly arranged and configured as the biasing members 92, 100 and locking pin 94 of Patent '777. Preferably, with the exception of the latch plate 100, similar latch mechanism structures, such as the latch mechanism 40 in Patent '777 are employed within the coupling body 300. A valve means 360 is provided within the bore 324 and is actuatable in a first open position enabling fluid flow and a closed position where flow is disabled. The valve means 360 is similarly constructed and arranged as the valve and poppet structures of Patent '777. The valve means 360 cooperates with the end 422 of the mating male insert 410b, when the male insert 410b is inserted into the coupling body 300 to be latched.

Preferably, the coupling body 300 is constructed and arranged to allow mounting of a latch mechanism, as in the latch mechanism 40 in Patent '777, except for the incorporation of the improved latch plate 100. The coupling body 300 may be connectable to a fluid line or other piece of fluid transport equipment at the second end 314 for use in fluid delivery and transmission. It will be appreciated that any suitable structures mateable with the coupling body 300 may be incorporated, so as to mount valve mechanisms and other adapting structures, for connection to fluid line(s) and pieces of fluid transport equipment.

In manufacturing a coupling body 200, 300 and latch plate 100 of the present invention, the following non-limiting descriptions are provided hereafter. Preferably, the coupling body 200, 300 is formed of well known plastic parts through a molding process. Preferably, the coupling body and latch plate are constructed and arranged to support transport of fluids used in air and liquid transport applications. Such fluids may include, but are not limited to, air, gasoline, ink, coolants and the like. It will be appreciated that the coupling body may be a material as suited for transport of a desired media. More preferably, the coupling body 200, 300 is formed as a single integrally molded piece. It will be appreciated that the dimensions of the coupling body 200, 300 including its bore 224, 324 may be scaled up or down as suitably needed to accomplish connection and sealing with mating parts, such as male inserts and pump/valve mechanisms and to accommodate desired fluid flow parameters.

The latch plate 100 preferably is formed of a metal material, and is produced by machining the metal material. Preferably, the latch plate 100 is produced of a hardened stainless steel. More preferably, the latch plate 100 is machined such that the annular aperture 124, radial edge 124a and pin opening 122 are stamped or punched through in a direction from the side the lever portion 118 extends. By forming the plate in this manner, any sharp edge that may be formed would reside on the side opposite from which the lever portion 118 extends. Where a mating male insert is inserted into the first bore 224, 324 of the coupling body 200, 300 and through the annular aperture 124, the raised radial edge 124a is prevented from biting into sealing members or surfaces of the mating insert when rotated or twisted with respect to the coupling body. In this configuration, the mating insert further avoids separation and camming out from the coupling body.

It will be appreciated that other materials may be used to form the coupling body and latch plate as known in the art. It will be further appreciated that well known materials may be employed for forming the latch mechanism features (as in Patent '777) including the biasing members, locking pin and other desired structures incorporated with the coupling body, such as valve and sealing structures.

Having described the embodiments of the present invention, modifications and equivalents may occur to one skilled in the art. It is intended that such modifications and equivalents shall be included with the scope of the invention.

I claim:

1. A coupling apparatus for fluid dispensing, comprising:
   a body including a first end and a second end, said first and second ends defining a first bore for enabling fluid passage longitudinally therethrough; and
   a mechanical latch assembly disposed proximate one of said first or second ends; said mechanical latch assembly including a latch plate, a first biasing member, a locking pin and a second biasing member,
      said latch plate is slidably mounted within a groove formed through said body, said groove extending transversely of said first bore, said latch plate defining a main portion having a top end and a bottom end, said latch plate including
         an annular aperture disposed between said top and bottom ends and being in fluid communication with said first bore of said body,
         a lever portion disposed proximate said top end, said lever portion enabling said latch plate to reciprocate within said groove in a released position and a latched position,
         a raised edge defining a raised portion of a perimeter edge defined by said annular aperture, said raised edge extending radially inward from respective portions of said perimeter edge into a space defined by said annular aperture, each end of said raised edge forming a notched portion extending to one of said respective portions of said perimeter edge, each notched portion including a first end connected to each end of the raised edge and a second end connected to each of the respective portions of said perimeter edge; and
         a pin opening disposed proximate said bottom end opposite of said lever portion;
      wherein said pin opening defines an enclosed edge defining a separate opening that is completely discontinuous from said perimeter edge of said annular aperture;

said first biasing member is positioned between a bottom surface of said lever portion and an outer surface of said body, said biasing member biases said latch plate in said latched position;

said locking pin is positioned in a second bore being disposed radially outward from said first bore and extending in an longitudinal direction, said locking pin extending through said pin opening, said locking pin being longitudinally moveable within said second bore and cooperating with said pin opening between a first position to retain said latch plate in said released position and a second position to move said latch plate in said latched position, said second biasing member is positioned between an end of said locking pin and an end of said second bore, said second biasing member biases said locking pin in said first position.

2. The coupling apparatus according to claim 1, wherein said main portion defines a substantially planar surface.

3. The coupling apparatus according to claim 1, wherein said annular aperture being disposed transversely through said main portion between said top and bottom ends.

4. The coupling apparatus according to claim 1, wherein said raised edge being a radiused edge contouring a portion of said perimeter edge.

5. The coupling apparatus according to claim 1, wherein said enclosed edge defining a greater width on a portion proximate said annular aperture and a lesser width on a portion proximate said bottom end.

6. The coupling apparatus according to claim 1, wherein said groove of said body defines a slot being formed from a single projection extending from said first or second end, said single projection forming a smooth and closed face at said first or second end, where said slot is disposed between said projection and a remaining portion of said body.

7. The coupling apparatus according to claim 1, wherein said body includes a recess area on said outer surface, said recess area being substantially planar and supporting said first biasing member.

8. The coupling apparatus according to claim 7, wherein said recess area including a stabilizing member formed within said recess area, said stabilizing member including a protrusion extending outward from said recess area and being engageable with said first biasing member to retain said first biasing member within said recess area.

9. The coupling apparatus according to claim 1, wherein said body including a partial shroud extending from an outer surface of said body, said shroud capable of protectively covering a portion of said mechanical latch assembly.

10. A coupling assembly for fluid dispensing, comprising:
a female coupling defining a body having a first end and a second end, and a first bore for enabling fluid passage longitudinally through said first and second ends; said female coupling including a mechanical latch assembly disposed proximate one of said first or second ends; said mechanical latch assembly including a latch plate, a first biasing member, a locking pin and a second biasing member, said latch plate is slidably mounted within a groove formed through said body, where said groove extends transversely of said first bore, said latch plate defining a main portion having a top end and a bottom end, said latch plate including an annular aperture disposed between said top and bottom ends and being in fluid communication with said first bore, a lever portion disposed proximate said top end, said lever portion enabling said latch plate to reciprocate within said groove in a released position and a latched position, a raised edge defining a raised portion of a perimeter edge defined by said annular aperture, said raised edge extending radially inward from respective portions of said perimeter edge into a space defined by said annular aperture, each end of said raised edge forming a notched portion extending to one of said respective portions of said perimeter edge, each notched portion including a first end connected to each end of the raised edge and a second end connected to each of the respective portions of said perimeter edge, and a pin opening disposed proximate said bottom end opposite said lever portion, wherein said pin opening defines an enclosed edge defining a separate opening that is completely discontinuous from said perimeter edge of said annular aperture;

said first biasing member is positioned between a bottom surface of said lever portion and an outer surface of said body, said biasing member biases said latch plate in said latched position;

said locking pin is positioned in a second bore that is disposed radially outward from said first bore and extending in an longitudinal direction, said locking pin extending through said pin opening, said locking pin being longitudinally moveable within said second bore and cooperating with said pin opening between a first position to retain said latch plate in said released position and a second position to move said latch plate in said latched position;

said second biasing member is positioned within said second bore between an end of said locking pin and an end of said second bore, said second biasing member biases said locking pin in said first position; and a male insert member having a first end and a second end, said first and second ends defining an opening for enabling fluid passage longitudinally therethrough, said male insert member including a tubular portion extending from said first end and being insertable in said female coupling, said tubular portion including an outer surface and having a circumferentially disposed groove, said groove communicating with said raised edge of said latch plate to connect and disconnect said male insert with said female coupling; said tubular portion including a sealing member disposed proximate said first end, said sealing member sealingly engaging an inner surface of said first bore of said female coupling when said male insert is inserted in said female coupling.

* * * * *